United States Patent [19]

Boeker

[11] Patent Number: 4,646,845
[45] Date of Patent: Mar. 3, 1987

[54] METAL SEAL FOR WELLHEAD APPARATUS

[75] Inventor: Roy A. Boeker, Humble, Tex.

[73] Assignee: Cactus Wellhead Equipment Co., Inc., Houston, Tex.

[21] Appl. No.: 640,719

[22] Filed: Aug. 14, 1984

[51] Int. Cl.$^4$ ............................................. E21B 33/03
[52] U.S. Cl. ................... 166/387; 277/34.6; 166/88
[58] Field of Search ...................... 166/387, 84, 86, 88, 166/212, 217; 277/73, 191, 117, 116.4–116.6, 118–121, 236; 285/144, 147

[56] References Cited

U.S. PATENT DOCUMENTS

| | | | |
|---|---|---|---|
| 609,752 | 8/1898 | Angell | 277/120 |
| 1,968,297 | 7/1934 | Hild | 166/86 |
| 2,712,455 | 7/1955 | Neilon | 166/88 |
| 3,438,654 | 4/1969 | Jackson, Jr. et al. | 166/88 |
| 4,291,889 | 9/1981 | Hardcastle | 277/116.4 |
| 4,306,742 | 12/1981 | Hardcastle | 285/147 |
| 4,381,114 | 4/1983 | Vanderford, Jr. | 277/34.6 |
| 4,381,868 | 5/1983 | Croy et al. | 277/27 |
| 4,390,186 | 6/1983 | McGee et al. | 277/236 |

Primary Examiner—Stephen J. Novosad
Assistant Examiner—Thuy M. Bui
Attorney, Agent, or Firm—Eugene L. Flanagan, III

[57] ABSTRACT

Methods and apparatus for effecting a fluid-tight seal between a surface of an oil and/or gas well tubing or casing and a wellhead member are provided, wherein the surface has been unprepared to form the seal. The wellhead member is positioned circumferentially about a stub of the tubing or casing. A metal-to-metal fluid-tight sealing means of the wellhead member is positioned adjacent the unprepared surface of the tubing or casing. The sealing means has at least one metallic projection positioned to extend toward the unprepared surface of the tubing or casing. The metallic projection is forced into the unprepared surface of the tubing or casing thus to form a seal therebetween.

31 Claims, 3 Drawing Figures

METAL SEAL FOR WELLHEAD APPARATUS

BACKGROUND OF THE INVENTION

The present invention relates to metal seals for sealing various wellhead devices to casing and tubing in oil and gas wells.

Oil and gas wells typically include one or more pipe strings extending downwardly into the earth from its surface. The strings are included one within the other and serve various purposes, such as maintaining the structural integrity of the well and for controlling fluid flow and fluid pressures within the well. For the purposes of this application, a string is referred to as casing if there is at least one string within that string, and the innermost string is referred to as tubing.

At the wellhead, various different types of wellhead members are connected and sealed to the casing and tubing and perform various functions, among which are to support the casing and tubing from the surface, to provide means for connecting fluid conduits to the tubing as well as to the annuli defined by the tubing and the various casing strings surrounding it, and for maintaining control of the fluid pressures experienced within the wellhead. To maintain control of the often very high fluid pressures, it is necessary to provide seals between the various wellhead members and the tubing and casing. Elastomeric seals have been provided in such devices which provide a seal against the tubing or casing when the seal is pressed inwardly thereagainst. This is achieved in various devices by exerting pressure vertically against the seal causing it to expand inwardly against the tubing or casing thus to seal it off. The elastomeric seal may be urged inwardly also by pressure exerted upon its outer circumferential surface. For example, such seals have been in use for many years wherein fluid pressure is exerted in an annulus surrounding the outside diameter of the elastomeric seal thus to urge it inwardly. The annulus is connected to the exterior of the device by means of a check valve through which fluid under pressure is introduced. In some such sealing methods, a liquid plastic under pressure is injected through the check valve for forming the seal; thereafter the plastic hardens so that the seal is permanently maintained.

Many well operators believe elastomeric seals to be unreliable under extremes of temperature which may cause them to break down, leading to an undesireable breakage of the seal. Accordingly, metal type seals have been adopted for use, since they do not share the temperature sensitivity problems of elastomeric materials. Such metal seals are provided as smooth rings adapted to be pressed against the outer circumferential surface of tubing or casing to effect a seal. It is, therefore, necessary that the outer surface of the casing or tubing where the seal is to be made must be smooth and be dimensioned within very close tolerances. It is thus necessary to prepare the tubing or casing at the well site carefully by machining it to mate closely with the smooth metal seal. This procedure is both time consuming and expensive.

SUMMARY

In accordance with one aspect of the present invention, a device is provided for effecting a fluid-tight seal between an unprepared surface of an oil and/or gas well tubing or casing and a wellhead member. The device comprises at least one metallic projection positioned in the wellhead member to extend toward the unprepared surface of the tubing or casing and adapted to penetrate the unprepared surface when forced thereinto, and means for urging the projection into the unprepared surface to effect a metal to metal seal between the tubing or casing and the wellhead member. It is, therefore, unnecessary to machine the tubing or casing to a smooth finish carefully dimensioned to fit a smooth metal seal. Rather, the relatively rough surface of the tubing or casing is penetrated by the metallic projection, thus rendering such machining and careful dimensioning unnecessary.

In accordance with a further aspect of the present invention, a tubing or casing spool adapted to be mounted on the tubing or casing of an oil and/or gas well is provided. The spool comprises a body adapted to be positioned over and circumferentially about a casing or tubing stub at the wellhead of an oil and/or gas well; and sealing means for forming a secondary seal between an outer surface of the casing or tubing stub and the body, the outer surface being unprepared for the formation of the seal. The sealing means comprises a metallic projection positioned to extend toward the stub when the body is positioned over the stub, and means for urging the projection into the unprepared surface of the stub to effect a metal-to-metal seal between the stub and the body.

In accordance with yet another feature of the invention, a method of effecting a fluid-tight seal between a surface of an oil and/or gas well tubing or casing and a wellhead member is provided wherein the surface has been unprepared to form the seal. The method comprises the steps of positioning the wellhead member circumferentially about a stub of the tubing or casing; positioning a metal-to-metal fluid-tight sealing means of the wellhead member adjacent the unprepared surface of the tubing or casing, the sealing means having at least one metallic projection positioned to extend toward the unprepared surface of the tubing or casing; and forcing the metallic projection into the unprepared surface of the tubing or casing to form a seal therebetween.

In accordance with a still further aspect of the invention, a secondary seal adapted to form a metal-to-metal seal with an unprepared outer surface of tubing or casing of an oil and/or gas well is provided. The secondary seal comprises sealing means adapted to be placed circumferentially about the unprepared outer surface of the tubing or casing, the sealing means having at least one metallic projection facing radially inwardly thereof and adapted to be forced radially inwardly of the unprepared outer surface of the tubing or casing to form a metal-to-metal seal therewith. The secondary seal additionally comprises means for urging the sealing means radially inwardly to force the metallic projection into the unprepared outer surface of the tubing or casing.

In accordance with a yet still further aspect of the present invention, a device is provided for effecting a fluid-tight seal between oil and/or gas well tubing or casing and a wellhead member. The device includes a housing; sealing means adapted to move relative to the housing to effect a seal with the tubing or casing; and means for providing an operator with a view of at least a movable portion of the sealing means sufficient to permit the operator to determine that the sealing means has been actuated.

BRIEF DESCRIPTION OF DRAWINGS

The present invention, as well as further objects and features thereof, will be understood more clearly and fully from the following description of certain preferred embodiments, when read with reference to the accompanying drawings, in which.

DETAILED DESCRIPTION OF CERTAIN PREFERRED EMBODIMENTS

Figure 1:
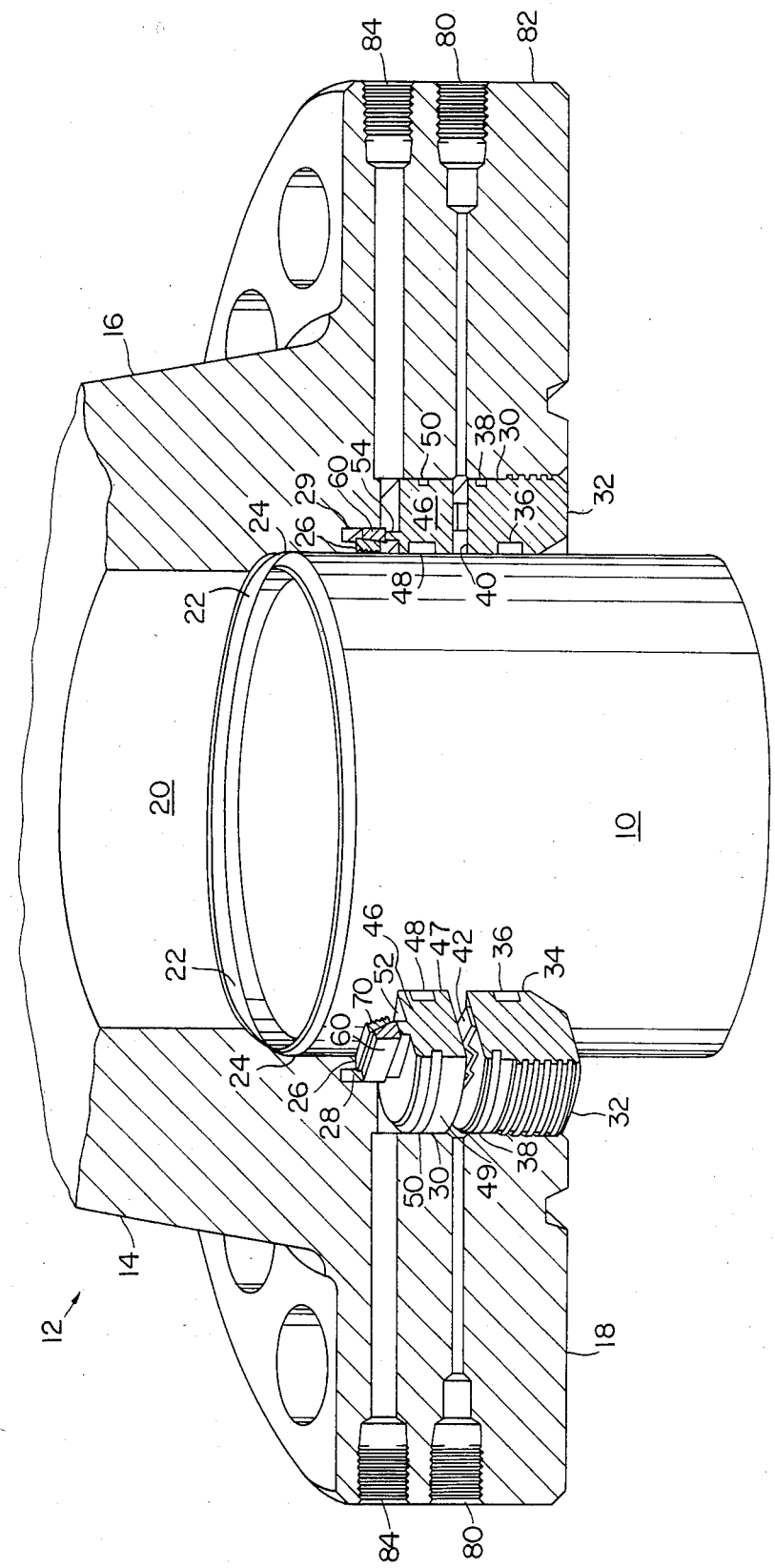
FIG. 1 is a partially sectional, partially broken away view of a tubing or casing head spool in accordance with one aspect of the present invention, mounted on the stub of a tubing or casing in an oil or gas well and sealed to an unprepared outer surface thereof by a metal-to-metal seal.

With reference first to FIG. 1, numeral 10 designates the stub of a tubing or casing at the wellhead of an oil or gas well. 12 designates a tubing or casing spool shown partially broken away and mounted over and circumferentially about the stub 10. The spool 12 includes a body 14 shown partially broken away, and including an upstanding, axially extending portion 16 and a flanged portion 18 at the lower extremity of the body 14.

Body 14 is provided with a generally cylindrical central bore 20 extending axially through the center of upper portion 16 and bounded at its lower extremity by a frusto-conical bore 22 concentric with bore 20 and expanding downwardly therefrom. Bore 22 is bounded at its lower extremity by the upper edge of an enlarged, cylindrical bore 24 concentric with bore 20 and bore 22. Bore 22 and bore 24 are dimensioned to mate with the upper extremity of stub 10.

Figure 2:
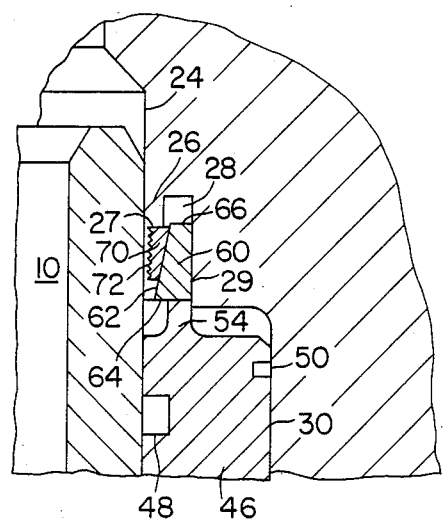
FIG. 2 is an enlargement of a portion of FIG. 1 illustrating a portion of the sealing mechanism of the spool of FIG. 1, prior to actuation thereof.
Figure 3:
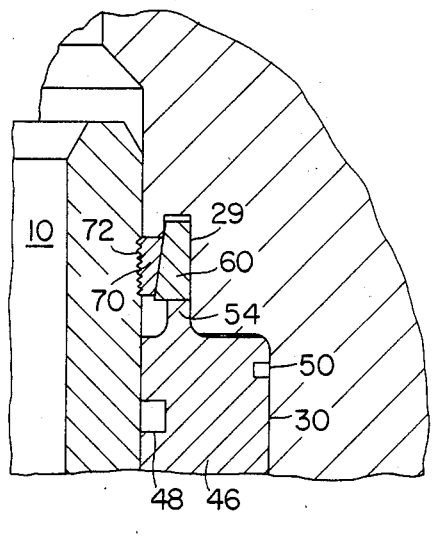
FIG. 3 illustrates the apparatus of FIG. 2 after actuation of the sealing means.

With reference also to FIG. 2, the lower extremity of bore 24 defines the inner surface of a downwardly extending, annular lip 26 having a downwardly facing annular surface 27 (FIG. 2). An outer surface of lip 26 defines the inner wall of an annular recess 28 concentric with lip 26. Recess 28 has an outer wall 29 extending axially beneath the lower extremity of lip 26 to the upper wall of an enlarged, lower bore 30 which extends to the lower extremity of flange 18.

The lower extremity of bore 30 is threaded to receive a bushing 32 having an inner wall 34 dimensioned to mate with the outer surface of stub 10 and forming a fluid-tight seal therewith by virture of an O-ring 36 recessed in wall 34. A further O-ring 38 recessed in the outer circumferential surface of the bushing 32 forms a fluid-tight seal against the bore 30.

Bushing 32 has an annular upper surface 40 which supports an annular leaf spring 42. Leaf spring 42 supports an annular piston 46 in spaced relation above top surface 40 of bushing 32. An inner wall 47 of the piston 46 is sealed against the casing or tubing 10 by an O-ring seal 48 recessed in the wall 47 and is sealed against the surface of the bore 30 by an additional O-ring seal 50 recessed in an outer wall 49 of piston 46.

Extending from a top surface 52 of the piston 46 is an annular projection 54 spaced radially from the outer surface of the tubing or casing 10 and the surface of the bore 30. Annular projection 54 is aligned axially with a wedge ring 60 disposed thereabove. Wedge ring 60 has an outer circumferential surface parallel with and fitting closely against outer wall 29 of recess 28, as seen in FIG. 2. Wedge ring 60 has an inner surface 62 angled at a non-zero angle with respect to its axis which corresponds to the axis of the tubing or casing 10 and the axis of the spool 12. Wedge ring 60 also has an annular lower surface 64 abutting an upper surface of projection 54 of piston 46. Wedge ring 60 also has an annular upper surface 66. Inner surface 62 of wedge ring 60 is angled with respect to its axis, as noted above, such that it extends from an inner edge of lower surface 64 and expands outwardly to an inner edge of upper surface 66. The surface area of lower surface 64 is greater relative to the surface area of upper surface 66.

As shown in FIGS. 1 and 2, a seal ring 70 is disposed radially inwardly of wedge ring 60 and has an outer surface angled at a non-zero angle with respect to its axis corresponding with the axis of the wedge ring 60. The outer surface of seal ring 70 is parallel to and abuts inner surface 62 of wedge ring 60 such that it fits closely thereagainst.

Seal ring 70 has a serrated inner surface 72 which defines a plurality of parallel ribs or projections spaced axially along the inner surface 72 and each extending completely around the inner surface of the ring 70. Each rib or projection projects radially inwardly to a sharpened edge adapted to penetrate an unprepared outer surface of the tubing or casing 10 when the seal ring 70 is compressed radially inwardly. The angled outer surface of the seal ring 70 extends from a lower annular surface of the ring 70 to an upper annular surface of the ring 70, the upper annular surface having a relatively greater surface area than the lower annular surface thereof and relatively greater than the area of surface 66 of wedge ring 60. The upper annular surface of the ring 70 is positioned to abut the downwardly facing annular surface 27 of the lip 26 when the seal ring is forced upwardly, thus limiting its upward travel.

With reference to FIG. 1, the flange 18 is provided with a plurality of ports 80 extending from an outer, circumferential surface 82 of the flange 18 radially inwardly thereof to the space defined by the lower surface of the piston 46 and the upper surface 40 of the bushing 32. It will be appreciated that fluid pressure introduced through the port 80 will be applied against the lower surface of the piston 46 and against the upper surface 40 of the bushing 32. The flange 18 also is provided with a plurality of test ports 84 extending from surface 82 radially inwardly and in communication with the space above surface 52 of piston 46 and the upper extremity of the lower bore 30, so that fluid pressure can be applied through the port 84 to the space between the surface 52 and the upper extremity of the bore 30.

In use, the spool 12 is positioned over and circumferentially about the stub 10, without the surface thereof having been prepared to receive the metal seal. The O-ring seals 36 and 48 form fluid-tight seals between the bushing 32 and the piston 46, respectively, and the outer surface of the stub 10 while the O-ring seals 38 and 50 form fluid-tight seals between the bushing 32 and the piston 46, respectively, and the surface of the bore 30. Then hydraulic fluid under pressure is introduced through the ports 80 to the space between the bushing 32 and the piston 46. Consequently, the piston 46 is forced upwardly and, since the projection 54 of the piston abuts the lower surface 64 of the wedge ring 60, the wedge ring likewise is forced upwardly into the recess 28. Since the inner surface 62 of the wedge ring 60 is angled as shown, for example, in FIG. 2, the ring 60 exerts an inward, compressive force against the outer surface of the seal ring 70 and, thus, the surface 62 acts as a cam surface to translate the upward force from piston 46 to an inwardly directed, compressive force against the seal ring 70. The seal ring 70 thus is compressed so that the ribs on the inner surface 72 thereof penetrate the unprepared outer surface of the tubing or casing 10, thus forming a metal-to-metal seal thereagainst. Due to the reactive force exerted against the surface 62 of the wedge ring 60, a metal-to-metal seal is formed between the inner surface 62 of the wedge ring 60, and the outer surface of the seal ring 70. This force likewise tends to expand the wedge ring 60 against the outer wall 29 of the recess 28, so that a metal-to-metal seal likewise is formed between these two surfaces.

In order to prevent the piston 46 from sliding upwardly when the spool 12 is lowered onto the stub 10, a temporary restraint is utilized to prevent motion of the piston 46 relative to the flanged portion 18. The restraint may take the form, for example, of a rod inserted through one of the test ports 84 to block upward motion of the piston 46. In the alternative, the piston 46 may be provided with a projection extending downwardly therefrom opposite one of the ports 80 and including a hole drilled radially inwardly thereinto. A rod introduced through the port 80 is inserted into the hole to block upward motion of the piston 46 until the rod is removed from the hole and the port 80. Accordingly, once the spool has been positioned over the stub 10 at the well site, the operator removes the restraint from the port in which it has been inserted, and then pressure may be applied against the lower surface of the piston 46 in order to effect the seal.

The test ports 84 are positioned and sized so that the operator can directly observe the motion of the piston 46 visually in response to the application of fluid pressure through the port 80. In this manner, the amount of setting or energizing force exerted on the seal ring can be monitored visually and can be controlled by controlling the amount of hydraulic force applied through the port 80. The effect of the hydraulic force on the tubing or casing 10 can be monitored with a long range hole gauge by measuring the deflection of the inside diameter of the tubing or casing.

The seal made between the metal seal ring 70 and the outer surface of the tubing or casing is pressure tested from below after the setting operation is completed. This test serves to check the ability of the seals to hold pressure and is done by connecting a hydraulic pump to the test ports 84 and applying pressure to the space beneath the wedge ring 60 and the seal ring 70, and the top surface 52 of the piston 46. As the pressure is increased, the piston 46 will move downwardly until it compresses the spring 42 against the bushing 32. Thereafter, the pressure is increased further until the desired test pressure level is obtained. Typically, the test pressure applied in this manner is about 80% of the minimum collapse pressure of the tubing or the casing 10.

The design of the metal-to-metal seal of the present invention tends to preserve the seal when the top thereof is subjected to well pressure. Once a seal has been made in the manner described above, any additional pressure within the tubing or casing 10 tends to swell the tubing or casing. This outward movement tends to make the seal ring tighten against the outer surface of the tubing or casing and also tends to tighten the wedge ring between the seal ring and the surface 29. Well pressure acting on top of the rings 70 and 60 tends to force the two rings together more tightly since the area of the top surface of the seal ring 70 is greater than the area of the top surface 66 of the wedge ring 60.

It will appreciated that the metal-to-metal seal of the present invention is useful with various types of wellhead apparatus, in addition to the head spool 12 shown in FIG. 1. For example, the invention is useful in sealing wellhead members such as flange adapters and tubing hangers against tubing or casing at a wellhead.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

I claim:

1. A method of effecting a fluid-tight seal between a surface of an oil and/or gas well tubing or casing and a wellhead member, wherein the surface has been unprepared to form the seal, comprising the steps of:
    positioning the wellhead member circumferentially about a stub of the tubing or casing;
    positioning a metal-to-metal fluid-tight sealing means of the wellhead member adjacent the unprepared surface of the tubing or casing, the sealing means having at least one metallic projection positioned to extend toward the unprepared surface of the tubing or casing; and
    forcing the metallic projection into and penetrating the unprepared surface of the tubing or casing to form a seal therebetween.

2. The method of claim 1, wherein the step of positioning the sealing means comprises positioning a seal ring member of the sealing means circumferentially about an unprepared outer surface of the tubing or casing, the metallic projection projecting inwardly of the seal ring member toward the unprepared surface; and
    wherein the step of forcing the projection into the unprepared surface comprises forcing the seal ring radially inwardly such that the projection is forced into the unprepared area.

3. The method of claim 2, wherein the step of positioning the seal ring member about the unprepared surface comprises positioning a seal ring member having a circumferential outer surface at least a portion of which is angled at a non-zero angle with respect to the unprepared outer surface;
    the step of positioning the sealing means further comprises positioning an actuating means radially outwardly of the angled portion of the outer surface of the seal ring, the actuating means being slidable axially with respect to the seal ring and having an inner cam surface adapted to engage the angled portion of the outer surface of the seal ring to force the seal ring radially inwardly when the actuating means is slid axially in a first direction with respect to the seal ring; and
    wherein the step of forcing the seal ring radially inwardly comprises sliding the actuating means axially in the first direction such that the cam surface thereof engages the angled portion of the outer surface of the seal ring and forces it radially inwardly.

4. The method of claim 1, wherein the step of positioning the sealing means comprises positioning at least one radially inwardly projecting rib of the sealing means circumferentially about an unprepared outer surface of the tubing or casing, the rib having an inner edge adapted to penetrate the unprepared outer surface when the metallic projection is forced into the unprepared outer surface; and wherein the step of forcing the metallic projection into the unprepared outer surface comprises penetrating the unprepared outer surface with the inner edge of the rib.

5. The method of claim 4, wherein the step of positioning the rib comprises positioning a plurality of ribs circumferentially about the unprepared outer surface; and wherein the step of penetrating the unprepared outer surface comprises penetrating the surface with a plurality of inner edges of the ribs.

6. The method of claim 1, wherein the sealing means comprises a movable member operative to move when the metallic projection is forced into the unprepared surface; and further comprising the step of detecting movement of the movable member to detect the forcing of the metallic projection into the unprepared surface.

7. A secondary seal adapted to form a metal-to-metal seal with an unprepared outer surface of tubing or casing of an oil and/or gas well, comprising:

sealing means adapted to be placed circumferentially about the unprepared outer surface of the tubing or casing for forming a metal-to-metal seal around said unprepared outer surface, the sealing means having at least one metallic projection facing radially inwardly thereof and adapted to be forced radially inwardly of the unprepared outer surface of the tubing or casing to form a metal-to-metal seal therewith; and means for urging the sealing means radially inwardly to force the metallic projection into and penetrate the unprepared outer surface of the tubing or casing so that a metal-to-metal seal is formed therewith.

8. The secondary seal of claim 7, wherein the sealing means comprises a seal ring, the metallic projection facing radially inwardly thereof.

9. The secondary seal of claim 8, wherein the urging means comprises an actuating means positioned radially outwardly of the seal ring and slidable axially with respect to the seal ring and the unprepared outer surface, the actuating means having a cam surface adapted to engage an outer surface of the seal ring and compress it radially inwardly toward the unprepared outer surface when the actuating means is forced to slide axially in a first direction with respect to the seal ring and the unprepared outer surface.

10. The secondary seal of claim 9, wherein at least a portion of the outer surface of the seal ring is angled at a non-zero angle with respect to the axis of the seal ring, and wherein the actuating means comprises an actuating ring disposed radially outwardly of the seal ring, the actuating ring having a radially inwardly facing surface at least a portion of which is angled at a non-zero angle with respect to the axis of the actuating ring and comprising the cam surface thereof.

11. The secondary seal of claim 10, wherein the seal ring has an upper surface forming a first, upwardly facing piston area; and wherein the actuating ring has an upper surface forming a second, upwardly facing piston area smaller than the first piston area.

12. The secondary seal of claim 10, further comprising a housing adapted to be placed circumferentially about the outer surface of the tubing or casing and wherein the seal ring and the actuating ring are disposed within the housing;

wherein the housing has a downwardly facing surface opposing the upper surface of the seal ring and providing a stop opposing upward movement of the seal ring; and wherein the housing has an annular recess disposed radially outwardly of the downwardly facing surface and extending upwardly therefrom and being sized to permit the actuating rib to extend axially therein.

13. The secondary seal of claim 7, wherein the at least one metallic projection comprises a radially inwardly projecting rib adapted to extend circumferentially about the unprepared outer surface of the tubing or casing, the rib having an inner edge adapted to penetrate the unprepared outer surface when the sealing means is urged inwardly thereagainst such that a metal-to-metal seal is formed thereby.

14. The secondary seal of claim 13, wherein the at least one metallic projection of the seal ring comprises a plurality of metallic projections thereof.

15. The secondary seal of claim 7, further comprising a housing in which the sealing means and the urging means are disposed;

the urging means including a member adapted to move relative to the housing when the sealing means is urged inwardly by the urging means; and wherein the housing is provided with viewing means for providing an operator with a visual indication of the movement of the member.

16. The secondary seal of claim 15, wherein the viewing means comprises an opening in the housing.

17. A device for effecting a fluid-tight seal between an unprepared surface of an oil and/or gas well tubing or casing and a wellhead member, comprising at least one metallic projection positioned in the wellhead member to extend toward the unprepared surface and adapted to penetrate the unprepared surface when forced thereinto, and means for urging the projection into the unprepared surface to effect a metal to metal seal between the unprepared surface of the tubing or casing and the wellhead member.

18. The device of claim 17, wherein the metallic projection extends from a sealing ring adapted to extend circumferentially about an outer unprepared surface of the tubing or casing and the urging means comprises means for forcing the ring towards the unprepared outer surface so that the projection is urged into the unprepared outer surface.

19. The device of claim 18, wherein the urging means comprises an actuating means positioned circumferentially outside the sealing ring and having an inner surface at least a portion of which is angled with respect to the axis of the actuating ring, the actuating means being slidably disposed axially with respect to the sealing ring such that an axial motion of the actuating means in a first direction brings the angled surface thereof into contact with an outer surface of the sealing ring and compresses the sealing ring inwardly, and wherein the urging means further comprises means for forcing the actuating means in the first direction.

20. The device of claim 19, wherein the means for forcing the actuating means comprises pressure actuated means responsive to fluid pressure to urge the actuating means in the first direction.

21. The device of claim 20, wherein the pressure actuated means comprises a piston having a first surface positioned for application of the fluid pressure thereto and slidably mounted to move in the first axial direction in response to pressure exerted on the first surface thereof so that the piston contacts and urges the actuating means in the first direction.

22. The device of claim 19, wherein the sealing ring has an upper surface forming a first, upwardly facing piston area; and wherein the actuating means comprises an actuating ring having an upper surface forming a second, upwardly facing piston area smaller than the first piston area.

23. The device of claim 17, wherein the at least one metallic projection comprises a radially inwardly projecting rib adapted to extend circumferentially about an unprepared outer surface of the tubing or casing, the rib having an inner edge adapted to penetrate the unprepared outer surface when the metallic projection is urged inwardly thereagainst such that a metal-to-metal seal is formed thereby.

24. The device of claim 23, wherein the at least one metallic projection comprises a plurality of metallic projections each having an inner edge adapted to penetrate the unprepared outer surface when urged thereaginst.

25. The device of claim 17, further comprising means for detecting the actuation of the device to effect the seal.

26. The device of claim 25, wherein the detecting means comprises means for detecting the actuation of the urging means.

27. The device of claim 26, further comprising a housing in which the urging means is disposed; and wherein the urging means includes a member adapted to move relative to the housing when the urging means is actuated; and wherein the detecting means includes means for providing an operator with a visual indication of the movement of the member within the housing.

28. The device of claim 27, wherein the detecting means comprises an opening in the housing.

29. A device for effecting a fluid-tight seal between an oil and/or gas well tubing or casing and a wellhead member, comprising:

a housing;

sealing means adapted to move relative to the housing to effect a seal with the tubing or casing; and means for providing an operator with a view of at least a movable portion of the sealing means sufficient to permit the operator to determine that the sealing means has been actuated.

30. A tubing or casing spool adapted to be mounted respectively on the tubing or casing of an oil and/or gas well, comprising:

a body adapted to be positioned over and circumferentially about a casing or tubing stub at the wellhead of an oil and/or gas well; and sealing means for forming a secondary seal between an outer surface of the casing or tubing stub and the body, the outer surface being unprepared for the formation of the seal;

the sealing means comprising a metallic projection positioned to extend toward the stub when the body is positioned over the stub, and means for urging the projection into the unprepared surface of the stub to effect a metal-to-metal seal between the stub and the body.

31. A device for effecting a fluid-tight seal between two wellhead members, comprising at least one metallic projection positioned on a first one of said two wellhead members and adapted to penetrate a metal surface of a second one of said two wellhead members, and means for urging the projection against said metal surface so that the projection penetrates said surface with unrecoverable deformation thereof such that a fluid-tight metal-to-metal seal is thus formed between the metallic projection and the metal surface.

* * * * *